United States Patent
Gim et al.

(10) Patent No.: US 11,926,226 B2
(45) Date of Patent: Mar. 12, 2024

(54) VEHICLE BODY

(71) Applicants: Hyundai Motor Company, Seoul (KR); Kia Corporation, Seoul (KR)

(72) Inventors: Seok Ju Gim, Seongnam-si (KR); Tae Gyu Park, Hwaseong-si (KR); Ho Yeon Kim, Daegu (KR); Sun Hyung Cho, Suwon-si (KR); Chul Hee Heo, Hwaseong-si (KR); Ji Ae Yong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 17/345,497

(22) Filed: Jun. 11, 2021

(65) Prior Publication Data
US 2022/0185125 A1 Jun. 16, 2022

(30) Foreign Application Priority Data
Dec. 10, 2020 (KR) .................. 10-2020-0172446

(51) Int. Cl.
*B60L 50/60* (2019.01)
*B62D 25/20* (2006.01)

(52) U.S. Cl.
CPC .............. *B60L 50/66* (2019.02); *B62D 25/20* (2013.01)

(58) Field of Classification Search
CPC ..... B60L 50/66; B62D 25/20; B62D 25/2009; B62D 25/2054; B60K 2001/0422; B60K 2001/0433
See application file for complete search history.

(56) References Cited

U.S. PATENT DOCUMENTS

| | | | |
|---|---|---|---|
| 4,108,469 A | 8/1978 | Schwarzbich | |
| 4,986,597 A | 1/1991 | Clausen | |
| 5,209,541 A | 5/1993 | Janotik | |
| 5,549,352 A | 8/1996 | Janotik et al. | |
| 5,692,798 A | 12/1997 | Wehner et al. | |
| 6,073,992 A | 6/2000 | Yamauchi et al. | |
| 6,135,498 A | 10/2000 | Vlahovic | |
| 6,282,790 B1 | 9/2001 | Jaekel et al. | |
| 6,334,642 B1 | 1/2002 | Waldeck et al. | |
| 6,824,204 B2 | 11/2004 | Gabbianelli et al. | |
| 6,948,768 B2 | 9/2005 | Corcoran et al. | |
| 7,677,646 B2 | 3/2010 | Nakamura | |
| 8,998,216 B2 | 4/2015 | Maeda et al. | |
| 9,004,499 B2 | 4/2015 | Zeweke et al. | |
| 10,800,224 B2 * | 10/2020 | Sellars | B60G 3/225 |
| 11,014,614 B2 | 5/2021 | Ayuzawa | |
| 11,505,260 B2 * | 11/2022 | Heo | B62D 25/04 |

(Continued)

FOREIGN PATENT DOCUMENTS

| CN | 19980070976 A | 10/1998 |
|---|---|---|
| CN | 107054039 A | 8/2017 |

(Continued)

*Primary Examiner* — Jeffrey J Restifo
(74) *Attorney, Agent, or Firm* — Slater Matsil, LLP

(57) ABSTRACT

A vehicle body includes a floor member, a support member coupled to an upper surface of the floor member, and a frame member coupled to an upper end of the support member to define a space between the floor member and the frame member, wherein the space is configured to house an item. The item may include a high-voltage battery.

13 Claims, 3 Drawing Sheets

(56) References Cited

U.S. PATENT DOCUMENTS

| | | | |
|---|---|---|---|
| 2010/0194086 A1* | 8/2010 | Yamamura | B62D 5/04 |
| | | | 280/779 |
| 2012/0255799 A1* | 10/2012 | Kohler | B60L 58/20 |
| | | | 180/65.245 |
| 2014/0124277 A1* | 5/2014 | Kurakawa | H01M 50/204 |
| | | | 180/65.1 |
| 2014/0144719 A1* | 5/2014 | Morgan | B60T 1/062 |
| | | | 180/65.31 |
| 2014/0224557 A1* | 8/2014 | Wu | B60K 1/04 |
| | | | 180/68.5 |
| 2015/0291056 A1* | 10/2015 | Nozaki | B60K 1/04 |
| | | | 180/65.1 |
| 2015/0343900 A1* | 12/2015 | Schlangen | B62D 33/02 |
| | | | 180/247 |
| 2016/0347373 A1 | 12/2016 | An et al. | |
| 2017/0174069 A1* | 6/2017 | Oyama | B60R 21/131 |
| 2017/0217296 A1* | 8/2017 | Nomura | B62D 21/152 |
| 2017/0225714 A1* | 8/2017 | Ito | B60L 53/16 |
| 2017/0225715 A1* | 8/2017 | Kobayashi | B60L 50/64 |
| 2017/0246942 A1* | 8/2017 | Takaki | B60K 1/04 |
| 2017/0334278 A1* | 11/2017 | Yamamoto | B62D 31/003 |
| 2019/0118631 A1* | 4/2019 | Yamamoto | B60K 5/00 |
| 2019/0299737 A1 | 10/2019 | Sellars et al. | |
| 2020/0223303 A1* | 7/2020 | Saeki | B60R 22/26 |
| 2020/0269922 A1 | 8/2020 | Kiyoshita et al. | |
| 2020/0307701 A1 | 10/2020 | Park et al. | |
| 2020/0324821 A1 | 10/2020 | Heo | |
| 2021/0188028 A1 | 6/2021 | Lou et al. | |
| 2021/0339617 A1* | 11/2021 | Ohkuma | B62D 25/20 |
| 2022/0097511 A1* | 3/2022 | Wang | B60K 6/40 |
| 2022/0176787 A1* | 6/2022 | Ostertag | B62D 25/20 |
| 2022/0185125 A1* | 6/2022 | Gim | B62D 25/20 |
| 2022/0185377 A1* | 6/2022 | Yong | B62D 23/005 |
| 2022/0388580 A1* | 12/2022 | Li | B62D 23/005 |
| 2023/0095674 A1* | 3/2023 | Inami | B60L 50/66 |
| | | | 180/65.1 |

FOREIGN PATENT DOCUMENTS

| | | |
|---|---|---|
| CN | 112046615 A | 12/2020 |
| EP | 0856455 A2 | 5/1998 |
| EP | 1084937 A2 | 3/2001 |
| JP | 6597761 B2 | 10/2019 |
| KR | 20150118809 A | 10/2015 |
| WO | 2005066012 A1 | 7/2005 |
| WO | 2018078989 A | 5/2018 |

* cited by examiner

VEHICLE BODY

CROSS-REFERENCE TO RELATED APPLICATIONS

This application claims the benefit of Korean Priority Application No. 10-2020-0172446, filed on Dec. 10, 2020, which application is hereby incorporated herein by reference.

TECHNICAL FIELD

The present invention relates to a vehicle body.

BACKGROUND

In general, a vehicle body must be designed to allow various components in the vehicle to be mounted thereon and, when a collision impact is applied to the vehicle, to efficiently absorb the collision impact and thus to protect passengers in the vehicle from the collision impact.

A conventional vehicle requires a space in which an engine or a battery is mounted and a space in which wheels, a suspension device, a steering device and the like for driving the vehicle are mounted. Accordingly, because wheel housings for accommodating the wheels, the suspension device provided at the wheels, the steering device connecting the wheels to each other, the drive device for supplying driving force and the like occupy a considerable amount of space, the vehicle body must be designed to provide sufficient space to accommodate the components and to absorb impacts applied to the vehicle. Furthermore, as the number of associated components increases, the process of manufacturing and assembling the vehicle is increasingly complicated, and the time required to perform the process is increased.

In recent years, an in-wheel system, in which a drive unit, a steering unit, a reduction gear and the like are mounted, has been developed. In the in-wheel system, because there is no need to connect the individual wheels to each other, the vehicle body must also be designed differently from a conventional vehicle. Accordingly, when a vehicle adopts the in-wheel system, there is a need to develop a vehicle body capable of providing space for wheel housings, ensuring sufficient rigidity of the vehicle body and simplifying a process of manufacturing and assembling the vehicle body.

The details described as the background art are intended merely for the purpose of promoting understanding of the background of the present invention, and should not be construed as an acknowledgment of the prior art that is previously known to those of ordinary skill in the art.

SUMMARY

The present invention relates to a vehicle body. Particular embodiments relate to a vehicle body of an in-wheel platform vehicle, in which a high-voltage battery is mounted in the space between a floor member defining the floor of the vehicle and a frame member coupled to the upper end of the floor member, and in which a seat is coupled to the upper end of the frame member.

Therefore, embodiments of the present invention can solve problems in the art, and an embodiment of the present invention provides a vehicle body of an in-wheel platform vehicle, which includes a floor member defining the floor of the vehicle and a frame member coupled to the upper end of the floor member via a plurality of support members in the state of being spaced apart from the floor member, in which a high-voltage battery is mounted in the space between the floor member and the frame member and a seat is coupled to the upper end of the frame member.

Embodiments of the present invention provide a vehicle body including a floor member provided at a lower portion of a vehicle, a support member coupled to an upper surface of the floor member, and a frame member coupled to an upper end of the support member so as to define a space between the floor member and the frame member, a high-voltage battery being mounted in the space.

The floor member may be configured to have a grid shape, and the support member may include a plurality of support members, which are spaced apart from each other and which are coupled at lower ends thereof to the upper surface of the floor member and extend upward therefrom.

An end of the support member may have a closed surface, and the support member may be coupled to the floor member or the frame member via the closed surface in a surface-contact state.

The support member may have an elongated form, which has formed therein an internal space and has an open surface, and may be coupled to the floor member or the frame member via the closed surface using a tool introduced thereinto through the open surface.

The frame member may be configured to have a grid shape having a plurality of lattice spaces, and a plurality of high-voltage batteries may be mounted in the plurality of lattice spaces.

The frame member may include a plurality of side members, which are disposed in the longitudinal direction of the vehicle, and a plurality of cross members, which are disposed in the width direction of the vehicle, ends of the side members or the cross members may have respective closed surfaces, and the side members and the cross members may be coupled to each other via the closed surfaces in a surface-contact state.

Each of the side members or the cross members may have an elongated form, which has formed therein an internal space and has an open surface, and the side members and the cross members may be coupled to each other or to the support member using a tool introduced thereinto through the open surface.

The high-voltage battery may be provided on the upper end thereof with a holder, and the holder may be coupled to the upper surface of the frame member so as to prevent the high-voltage battery, mounted in the space between the floor member and the frame member, from escaping upwards.

The holder may extend across the upper surface of the high-voltage battery such that two ends of the holder extend outwards beyond the high-voltage battery and are coupled to the upper surface of the frame member in a surface-contact state.

The floor member may be provided with a floor panel adapted to shield the upper surface of the floor member, and the floor panel may support the lower end of the high-voltage battery, mounted in the space between the floor member and the frame member, and may prevent the high-voltage battery from escaping downwards.

The frame member may be provided on the upper surface thereof with at least one seat including a support at the lower end thereof, and the seat may be coupled to the frame member via the support in the state of being spaced apart from the frame member.

When the high-voltage battery is not mounted in the space, the space may serve as a reception space for storing passenger baggage.

The frame member may be disposed in a width direction of the vehicle, and a plurality of high-voltage batteries may be fitted and mounted in the space between the floor member and the frame member in the width direction of the vehicle.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
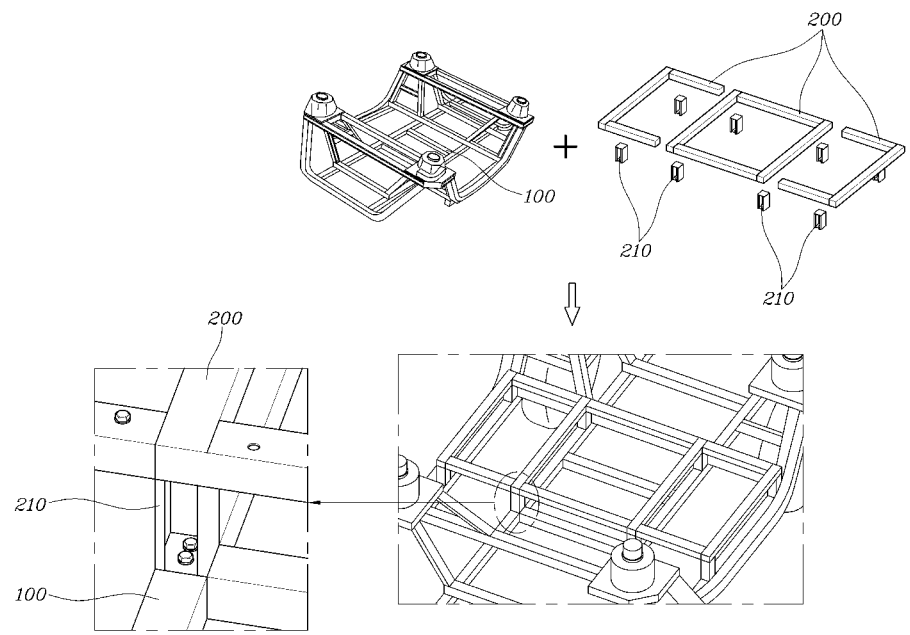
FIG. 1 is a view illustrating a vehicle body according to an embodiment of the present invention in which a frame member is coupled to a floor member via a support member.
Figure 2:
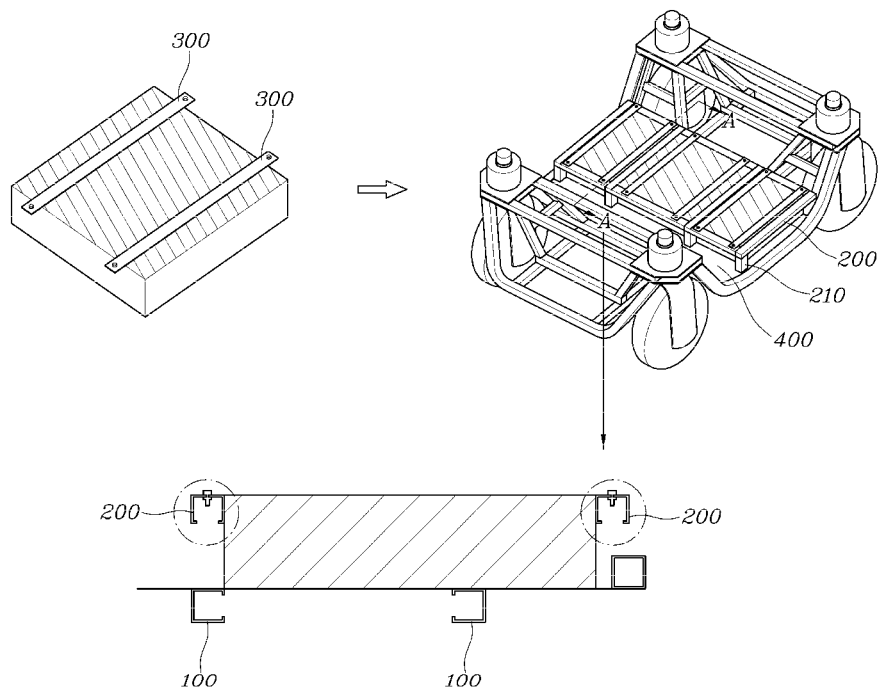
FIG. 2 is a view illustrating the vehicle body according to an embodiment of the present invention in which a high-voltage battery is mounted in the space between the floor member and the frame member.
Figure 3:
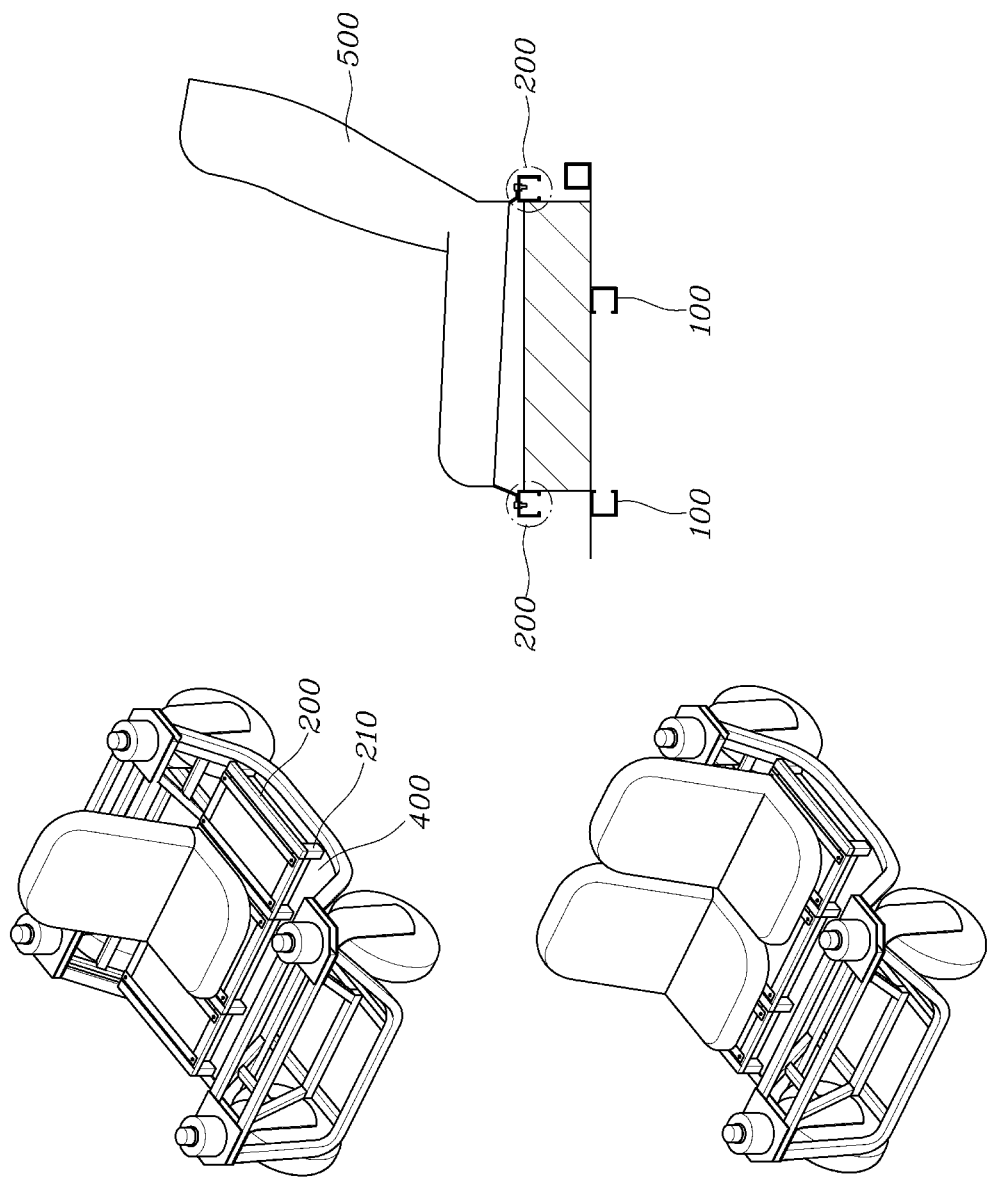
FIG. 3 is a view illustrating the vehicle body according to an embodiment of the present invention in which a seat is mounted on the frame member.
Figure 4:
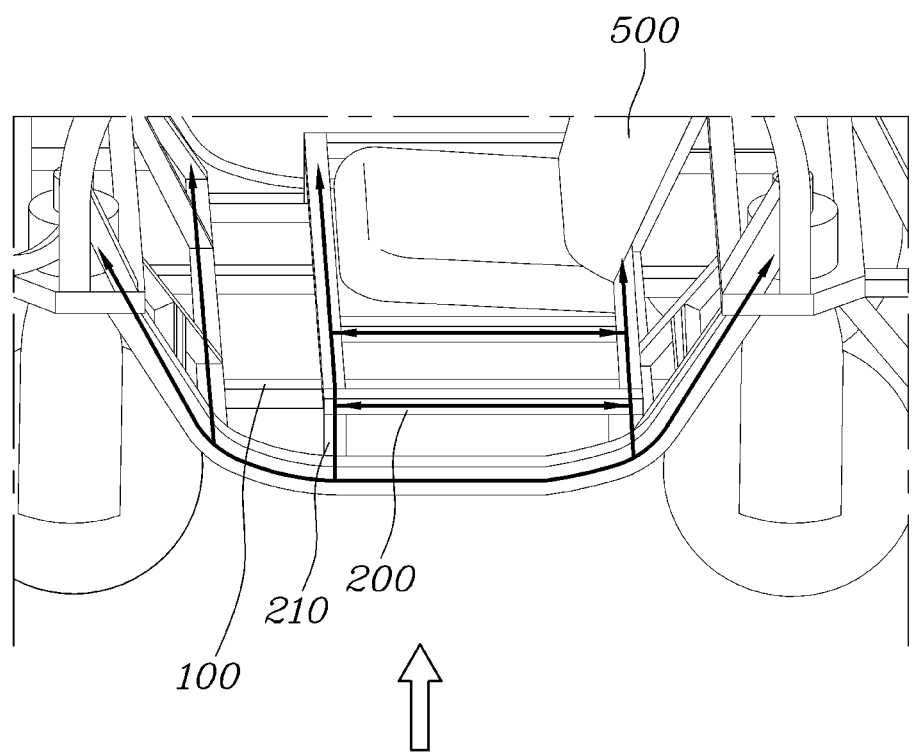
FIG. 4 is a view illustrating distribution of the load applied to the vehicle body according to an embodiment of the present invention in a lateral direction.

FIG. 1 is a view illustrating a vehicle body according to an embodiment of the present invention in which a frame member is coupled to a floor member via a support member. FIG. 2 is a view illustrating the vehicle body according to an embodiment of the present invention in which a high-voltage battery is mounted in the space between the floor member and the frame member. FIG. 3 is a view illustrating the vehicle body according to an embodiment of the present invention in which a seat is mounted on the frame member. FIG. 4 is a view illustrating distribution of the load applied to the vehicle body according to an embodiment of the present invention in a lateral direction.

FIG. 1 is a view illustrating the vehicle body according to an embodiment of the present invention in which the frame member is coupled to the floor member via the support member. FIG. 2 is a view illustrating the vehicle body according to an embodiment of the present invention in which a high-voltage battery is mounted in the space between the floor member and the frame member. The vehicle body according to an embodiment of the present invention includes a floor member 100 provided under the vehicle, a support member 210 coupled to the upper surface of the floor member 100, and a frame member 200 coupled to the upper end of the support member 210 so as to define a space between the floor member 100 and the frame member 200. The floor member 100 may be configured to have the form of a grid, and the support member 210 may include a plurality of support members, which are spaced apart from each other and which are coupled at the lower ends thereof to the upper surface of the floor member 100 and extend upwards therefrom.

Unlike conventional vehicles, the vehicle body according to an embodiment of the present invention is intended to be applied to a vehicle adopting an in-wheel system, and does not require connection of a drive shaft or a steering device to wheels. Accordingly, each of the wheels of the vehicle is provided at the upper end thereof with a shock absorber and a shock absorber housing. In order to ensure sufficient rigidity of the vehicle body in the event of a collision, the vehicle body is composed of multiple truss members. The in-wheel system vehicle is driven using a high-voltage battery. Here, since the high-voltage battery is mounted in the space between the grid-shaped floor member 100 and a seat, it is possible to easily ensure sufficient internal space in the vehicle and to protect the high-voltage battery from external impacts.

Specifically, the vehicle body is provided at the lowermost end thereof with the grid-shaped floor member 100, and each of the corners of the floor member 100 is provided at the upper end thereof with a shock absorber and a shock absorber housing so as to allow the wheel of the in-wheel system vehicle to be positioned therein. The floor member 100 is composed of a plurality of transverse members and a plurality of longitudinal members, and a passenger compartment is defined above the floor member wo by front and rear vehicle body members and lateral vehicle body members and pillar members at the lateral sides of the vehicle.

Unlike a conventional vehicle, the in-wheel system vehicle is constructed such that a high-voltage battery having the form of a thin plate is mounted on the upper surface of the floor member wo so as to supply power to the vehicle. In the vehicle body according to an embodiment of the present invention, the space in which the high-voltage battery is mounted is defined by the plurality of support members 210 extending upwards from the floor member 100 and the frame member 200 coupled to the upper ends of the support members 210, and the seat is held above the high-voltage battery.

In the vehicle body according to an embodiment of the present invention, the end of each of the support members 210 may have a closed surface, and the end of the support member may be coupled to the floor member wo or the frame member 200 via the closed surface thereof in a surface-contact state. Each of the support members 210 is configured to extend with the internal space formed therein and to be open at one surface thereof. Hence, the closed surface of the support member 210 may be coupled to the floor member 100 or the frame member 200 using a tool introduced into the space through the open surface. This coupling method offers effects of maintaining the rigidity of the vehicle itself and the coupling rigidity between the members when the support members 210 are coupled to the floor member 100 or the frame member 200 and of enabling a human or a robot to easily and conveniently assemble the members in an assembly process.

Specifically, the frame member 200 is composed of a plurality of side members and a plurality of cross members, which are assembled with each other so as to define a plurality of rectangular unit frames. The plurality of support members 210 are disposed at the corners of the unit frames so as to stably support the frame member 200. By virtue of this structure, it is possible to ensure collision rigidity and assembly rigidity between the floor member wo and the frame member 200 and to protect the high-voltage battery from external impacts when the high-voltage battery is fitted and mounted in the space between the floor member 100 and the frame member 200. Furthermore, since each of the side members and the cross members, which constitute the frame member 200, also has an open cross-section, like each of the support members 210 having the open cross-section, it is possible to enable a human or a robot to easily and conveniently assemble the members while maintaining the rigidity of the vehicle itself and the coupling rigidity between the members during an assembly process.

In the vehicle body according to an embodiment of the present invention, a holder 300 is provided on the upper end of the high-voltage battery. The holder 300 may be coupled to the upper surface of the frame member 200 in order to prevent the high-voltage battery from escaping upwards when the high-voltage battery is mounted in the space between the floor member 100 and the frame member 200. The holder 300 may extend across the upper surface of the high-voltage battery such that the two ends thereof extend outwards beyond the high-voltage battery and are coupled to the upper surface of the frame member 200 in a surface-contact state.

Specifically, the holder 300 may be configured to have the form of a band bracket, and may be coupled to the upper surface of the high-voltage battery, or may cover the upper surface of the high-voltage battery. The holder 300 may be configured to have the form of a thin plate, the two ends of which extend outwards beyond the battery so as to be conveniently coupled to the upper surface of the frame member 200 through bolting or the like. Since the frame member 200 also has an open cross-section, the holder 300 is easily attached and detached, and is also easily detached at the time of the replacement of the high-voltage battery.

In the vehicle body according to an embodiment of the present invention, the floor member 100 may be provided with a floor panel 400 for shielding the upper surface of the floor member mo. When the high-voltage battery is mounted in the space between the floor member 100 and the frame member 200, the floor panel 400 supports the lower end of the high-voltage battery to prevent the high-voltage battery from escaping downwards. The floor panel 400 may shield the upper surface of the floor member 100 to prevent the high-voltage battery from escaping downwards and to prevent an impact from being applied to the lower surface of the high-voltage battery. The floor panel 400 having a plate shape may be disposed between the upper surface of the floor member 100 and the lower ends of the support members 210, and may be coupled thereto.

FIG. 3 is a view illustrating the vehicle body according to an embodiment of the present invention in which a seat is mounted on the frame member. In the vehicle body according to an embodiment of the present invention, the frame member 200 may be provided on the upper surface thereof with at least one seat 500. The seat 500 may be provided at the lower end thereof with a support such that the seat 500 is coupled to the frame member 200 via the support in the state of being spaced apart from the frame member 200.

Specifically, the seat 500 may include one or more seats, which are arranged in the width direction of the vehicle. The seat 500 may be provided at the lower end thereof with a plurality of supports. The upper ends of the supports support the front and rear ends of the seat 500 at multiple points, and the lower ends of the supports are coupled to the upper surface of the frame member 200 at points other than the points at which the holder 300 is coupled to the frame member 200 so as to prevent the supports from overlapping the holder 300. The supports may also be conveniently coupled to the upper surface of the frame member 200 through the open surface of the frame member 200 through bolting or the like, thereby allowing the seat 500 to be easily attached and detached.

In the vehicle body according to an embodiment of the present invention, when no high-voltage battery is mounted in the space between the floor member 100 and the frame member 200, the space may serve as a reception space for storing passenger baggage. Meanwhile, in the case in which a sufficient number of high-voltage batteries are mounted in the vehicle, the space defined between the frame member 200 and the lower end of the seat 500 may serve as a reception space for storing passenger's belongings, thereby maximizing utilization of space and passenger convenience.

FIG. 4 is a view illustrating distribution of a load applied to the vehicle body according to an embodiment of the present invention in a lateral direction. In the vehicle body according to an embodiment of the present invention, the frame member 200 may be disposed in the width direction of the vehicle, and a plurality of high-voltage batteries may be fitted and mounted into the space between the floor member 100 and the frame member 200 so as to be arranged in the width direction of the vehicle. When a passenger is riding in the vehicle, the passenger is exposed to greater danger from the lateral side of the vehicle than from the front or rear end of the vehicle because the passenger is positioned closer to the outside at the lateral side of the vehicle than at the front or rear end of the vehicle.

Accordingly, since the frame member 200 is disposed in the width direction of the vehicle, it is possible to protect the passenger in the vehicle and the high-voltage battery fitted in the space from an impact applied thereto in the lateral direction. Furthermore, since the frame member 200 distributes impacts to the floor member 100 and other members coupled to the lateral surfaces of the floor member 100, it is possible to increase the rigidity of the vehicle in the event of a lateral collision and to protect the passenger and the high-voltage battery from impact applied thereto in the lateral direction.

The vehicle body according to an embodiment of the present invention is capable of providing a passenger compartment having the largest possible space and protecting the high-voltage battery mounted in the vehicle by virtue of the support members 210 coupled to the upper end of the floor member 100 and the frame member 200 coupled to the upper ends of the support members 210. Furthermore, it is possible to ensure the rigidity of the vehicle body itself and the assembly rigidity thereof by virtue of the coupling structure between the various members and to conveniently assemble the various members through the open surfaces of the members using bolting or the like. In addition, the vehicle body according to an embodiment of the present invention is capable of being conveniently applied to various kinds of vehicles and of allowing any high-voltage batteries having various sizes to be mounted thereto merely by changing the size of the frame member 200. Furthermore, the space under the frame member 200 and the space above the frame member 200 are capable of being used as spaces for accommodating not only the high-voltage battery and the seat but also various items.

As is apparent from the above description, embodiments of the present invention provide a vehicle body of an in-wheel platform vehicle, which includes a floor member defining the floor of the vehicle and a frame member coupled to the upper end of the floor member via a plurality of support members in the state of being spaced apart from the floor member, in which a high-voltage battery is mounted in the space between the floor member and the frame member and a seat is coupled to the upper end of the frame member.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A vehicle body comprising:
   a floor member;
   a support member coupled to an upper structure of the floor member; and
   a frame member coupled to an upper end of the support member to define a space between the floor member and the frame member,
   wherein the space is configured to house an item,
   wherein a lower end or the upper end of the support member has a closed surface, and
   wherein the support member is coupled to the floor member or the frame member via the closed surface in a surface-contact state.

2. The vehicle body according to claim 1, wherein the support member has an elongated form, an internal space, and an open surface, and wherein the support member is coupled to the floor member or the frame member via the closed surface using a tool introduced through the open surface.

3. The vehicle body according to claim 1, wherein the item comprises a high-voltage battery or passenger baggage.

4. A vehicle body comprising:
   a floor member;
   a support member coupled to an upper surface of the floor member; and
   a frame member coupled to an upper end of the support member to define a space between the floor member and the frame member,
   wherein the space is configured to house an item,
   wherein the frame member includes a plurality of side members disposed in a longitudinal direction of the vehicle body, and a plurality of cross members disposed in a width direction of the vehicle body, and
   wherein ends of the side members or the cross members have a closed surface, and the side members and the cross members are coupled to each other via the closed surface in a surface-contact state.

5. The vehicle body according to claim 4, wherein each of the side members or the cross members has an elongated form, an internal space, and an open surface, and wherein the side members and the cross members are couplable to each other or to the support member by a tool introducible through the open surface.

6. A vehicle body comprising:
   a floor member;
   a support member coupled to an upper surface of the floor member;
   a frame member coupled to an upper end of the support member to define a space between the floor member and the frame member;
   a holder coupled to an upper surface of the frame member; and
   at least one high-voltage battery mounted in the space, wherein an upper end of the high-voltage battery is coupled to the holder to prevent the high-voltage battery, mounted in the space between the floor member and the frame member, from escaping upwards.

7. The vehicle body according to claim 6, wherein the holder extends across an upper surface of the high-voltage battery such that two ends of the holder extend outwards beyond the high-voltage battery and are coupled to the upper surface of the frame member in a surface-contact state.

8. The vehicle body according to claim 6, wherein the floor member further comprises a floor panel configured to shield an upper surface of the floor member, and wherein the floor panel is configured to support a lower end of the high-voltage battery, mounted in the space between the floor member and the frame member, and to prevent the high-voltage battery from escaping downwards.

9. The vehicle body according to claim 6, wherein the frame member is disposed in a width direction of the vehicle body, wherein the at least one high-voltage battery comprises a plurality of high-voltage batteries, and wherein the high-voltage batteries are fitted and mounted in the space between the floor member and the frame member in the width direction of the vehicle body.

10. The vehicle body according to claim 6, wherein the floor member has a grid shape, and the support member includes a plurality of support members spaced apart from each other and coupled at lower ends to the upper surface of the floor member and extending upwards from the upper surface of the floor member.

11. A vehicle comprising:
    a vehicle body comprising:
       front and rear vehicle body members;
       a floor member provided at a lower portion of the vehicle extending between the front and rear vehicle body members;
       a support member coupled to an upper surface of the floor member; and
       a frame member coupled to an upper end of the support member to define a space between the floor member and the frame member, wherein the space is configured to house at least one high-voltage battery; and
    a seat coupled to an upper surface of the frame member,
    wherein the frame member includes a plurality of side members disposed in a longitudinal direction of the vehicle and a plurality of cross members disposed in a width direction of the vehicle,
    wherein ends of the side members or the cross members have a closed surface, and
    wherein the side members and the cross members are coupled to each other via the closed surface in a surface-contact state.

12. The vehicle according to claim 11, wherein the floor member has a grid shape, and wherein the support member includes a plurality of support members spaced apart from each other and coupled at lower ends to the upper surface of the floor member and extending upwards from the upper surface of the floor member.

13. The vehicle according to claim 11,
    wherein the floor member further comprises a floor panel configured to shield an upper surface of the floor member, and
    wherein the floor panel is configured to support a lower end of the at least one high-voltage battery, mounted in the space between the floor member and the frame member, and to prevent the at least one high-voltage battery from escaping downwards.

* * * * *